Sept. 13, 1932.  A. B. CUNNINGHAM  1,877,738
DIFFERENTIAL GAS BALANCE
Filed April 23, 1924
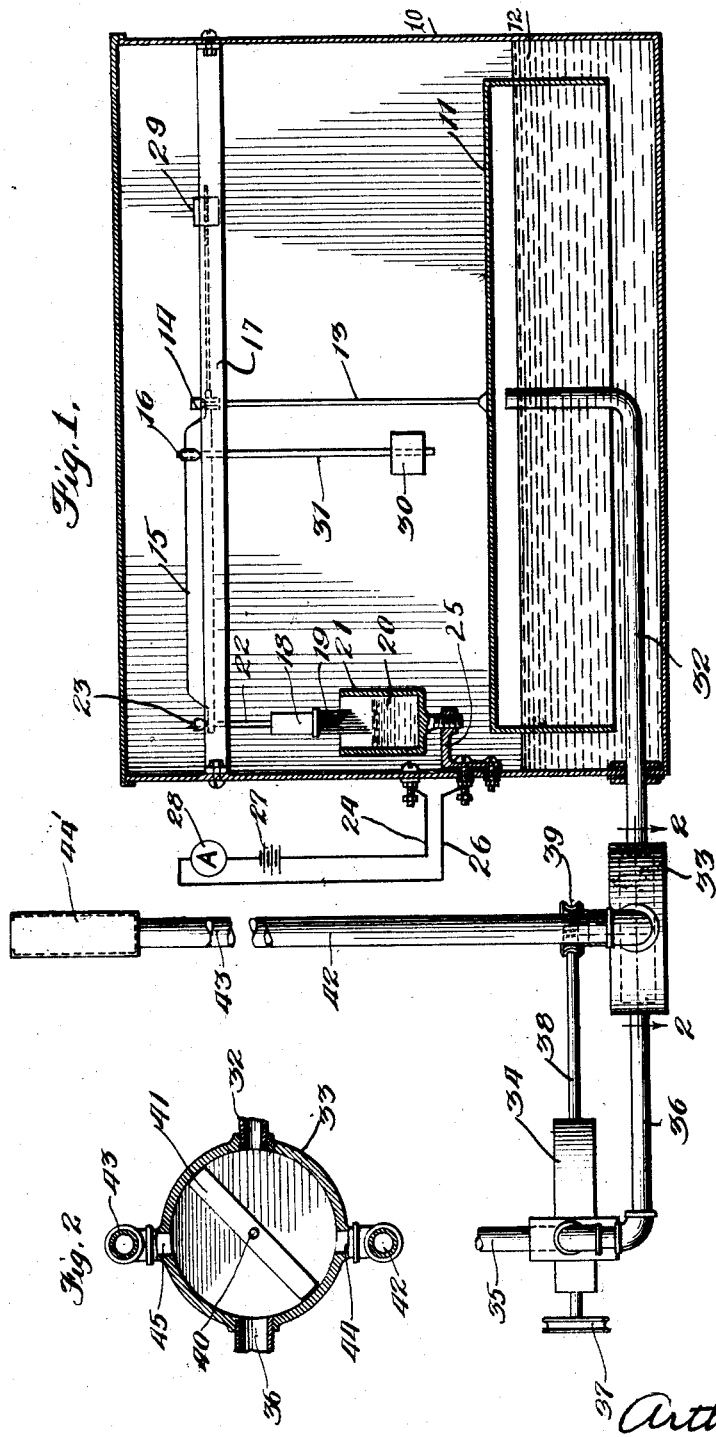
Inventor
Arthur B. Cunningham
By Nixon & Crane
Attys.

Patented Sept. 13, 1932

1,877,738

UNITED STATES PATENT OFFICE

ARTHUR B. CUNNINGHAM, OF CHICAGO, ILLINOIS, ASSIGNOR TO REPUBLIC FLOW METERS CO., OF CHICAGO, ILLINOIS, A CORPORATION OF ILLINOIS

DIFFERENTIAL GAS BALANCE

Application filed April 23, 1924. Serial No. 708,598.

This invention relates to a device for measuring the difference in density of two kinds of gases by comparing their relative weight, and has for its object the provision of such a device which shall be of improved construction and operation and in which stationary columns of the gases are compared, there being means for replenishing the gas in one of the columns repeatedly to provide a substantially continuous indication of the characteristics of the gas from which the supply is taken. The invention is exemplified in the combination and arrangement of parts shown in the accompanying drawing and described in the following specification and it is more particularly pointed out in the appended claims. In the drawing Figure 1 is a vertical sectional view with parts in elevation showing one embodiment of the present invention;

Fig. 2 is a horizontal section substantially on line 2—2 of Fig. 1;

Fig. 3 is a side elevation of the top portion of the sample column; and

Fig. 4 is a fragmentary top plan view of the support for the balance beam.

The embodiment of the invention illustrated in the drawing is arranged to determine the relative weight of a column of gas as compared with the weight of a column of air of the same height, the result being indicated electrically. The apparatus may be used for indicating continuously the specific gravity of the gas taken from any given source or for indicating the percentage of various constituents of the gas such, for instance, as the percentage of carbon dioxid in flue gases or the percentage of sulphur dioxid in a given mixture. Other uses of the invention will readily suggest themselves to those skilled in the art.

Referring more particularly to the drawing, the numeral 10 designates a large tank made of suitable material, the tank being loosely closed at the top so that the interior of the tank is subjected to atmospheric pressure. Inside the tank there is a large bell 11 sealed by a liquid 12 which may be oil or other suitable substance. The bell 11 is of light construction and is supported by a rod 13 suspended from a knife edge 14 carried on a balance beam 15. The beam 15 is supported by a knife edge 16 which rests on a pair of fixed beams 17 secured at their opposite ends to the walls of the tank 10. One end of the beam 15 carries a housing 18 for containing an electrical resistance member having a series of contact rods 19 tapped therefrom at different positions and extending downwardly toward a conducting fluid 20 held in a receptacle 21. The contact rods 19 are of different lengths so that varying amounts of the resistance in the container 18 will be short circuited depending on the vertical disposition of the contact rods 19. The housing 18 is carried by a rod 22 supported from a knife edge 23 mounted on the beam 15. One end of the resistance member in the housing 18 is grounded on the tank 10 and hence makes contact with a conductor 24 electrically connected with the tank. The opposite end of the resistance member is connected through the contact rods 19 and the liquid 20 with a bracket 25 insulated from the tank 10 and connected with a conductor 26. As the height of the container 18 is changed by a movement of the beam 15 the resistance in the circuit between the conductors 24 and 26 will be varied. If the conductors are connected to a suitable source of current such as a battery 27 and an indicating instrument such as an ammeter 28, the instrument will indicate the amount of current flowing in the circuit which in turn will give an indication of the position of the beam 15. This method of indicating electrically the position of a movable member is more fully described in patent to Jacob M. Spitglass No. 1,390,394. Since the beam 15 is controlled by the bell 11, the ammeter 28 will indicate the height of the bell 11. A counterbalancing weight 29 is secured to the end of the beam opposite the housing 18 and a calibrating weight 30 is secured to a rod 31 rigidly connected with the beam 15 and extending downwardly therefrom directly below the knife edge 16. Gas is supplied to the interior of the bell 11 through a pipe 32 which is connected with a distributor 33. The gas is supplied to the distributor 33 from any desired source by means of a gas pump 34 having an inlet 35 and an outlet 36 connecting the pump with the distributor. The pump 34 is provided with a drive pulley 37 which may be connected with any suitable source of power. The pump shaft 38 is connected by worm gear 39 with a vertical shaft 40 passing through the distributor 33 and provided with a revolving vane or dividing member 41. The shaft 40 is concentric with the cylindrical wall of the distributor 33 so that the vane 41 divides the interior of the distributor into equal compartments. A pair of sample columns 42 and 43 communicate with the distributor 33 through openings 44 and 45, respectively. It will be noted that the openings 44 and 45 are offset slightly relatively in the same direction to the center of the distributor so that during rotation of the vane 41 one of the openings 44 and 45 will be connected with the pipe 36 leading to the pump 34 slightly before the other opening is disconnected therefrom. In this way the pipe 36 is at no time connected to a completely closed chamber, as such a condition would produce an undesirable back pressure on the pump. The upper ends of the sample columns 42 and 43 are connected to a common compartment 44′ which is open at its top to the atmosphere. The rotation of the vane 41 alternately connects the columns 42 and 43 with the pipes 36 and 32 respectively, so that for a short period one of the sample columns will be supplied with gas from the pump 34 and will then be disconnected from the pump and connected with the bell 11 through the pipe 32. While the column is connected with the bell it will be disconnected from the pump so that the pressure exerted on the interior of the bell will be produced by a stationary column of gas in the vertical tube which is free from any movement produced by the pump. While one of the sample columns 42 and 43 is connected with the bell 11 the other will be in communication with the pump in order to be supplied with a fresh charge from the source of supply. At no time is the outlet 32 and the interior of the bell 11 subjected to the pressure exerted by the pump. By this arrangement the interior of the bell 11 is continuously subjected to pressure exerted by a stationary column of gas, and the supply of gas is renewed at short intervals so that the gas in the sample column will be a true indication of the character of the gas from the source of supply at all times.

In operation the usual intervals for interchange between the columns is about five seconds, which permits the entire contents of the column to be changed by the fresh supply. Since the exterior of the bell 11 is subjected to atmosphere it will be apparent that the difference in pressure between the exterior and interior of the bell will be a measure of the difference in weight between the column of gas in the sample tube 42 or 43 connected with the interior of the bell and a column of air of the same height. The tubes 42 and 43 are much less in cross sectional area than the interior of the bell but the pressure produced within the bell is of course independent of the cross sectional area of the column. The actual force to be overcome by the counterweight on the beam 15 will represent the difference in weight of two columns, one of air and the other of gas having heights equal to the height of the sample tubes 42 and 43 and cross sectional areas equal to the area of the bell 11. This difference of weight between two gases is of course a relatively small quantity, and when a column of gas of ten or even twenty feet is used the difference of pressure will be only a few hundredths of an inch of water pressure. It is found that if the gas in the sample column is moving during measurement the resistance offered to the movement of the gas by the friction at the sides of the pipe materially affects the accuracy of the determination. This resistance is by no means constant, since it varies with the square of the velocity of the gas and is changed by any variation in the surface of the pipe enclosing the column. In fact it has been found by experience that where an attempt is made to use a moving column of gas the error sometimes amounts to over one hundred per cent. The present invention prevents this difficulty, since a stationary column of gas is always used for making a comparison.

It will be noted that for a short distance at their tops the two columns are united in a single chamber. This ensures a supply of gas at the top of the column at all times so that air is excluded from the top of the column, thus ensuring a complete column of gas even though the pressure in the bell should raise the bell so as to lower the gas in the column.

While I have described one embodiment of the invention and have referred to some uses to which the invention may be put, it will be understood that many variations in details may be made without departing from the spirit of the invention as defined in the appended claims, and that many other uses will readily suggest themselves to those skilled in the art.

I claim:

1. A differential gas balance, comprising a bell, means for subjecting said bell to differential gas pressures, a balance beam, a plurality of contact members of different lengths carried by said beam, a conductor for engaging the ends of different contact members for different positions of said beam, and electrical indicating means connected with said conductor and contact members.

2. Gas testing apparatus, comprising a bell, a pair of stand pipes for receiving gas to be tested, a source of supply, a distributor connected with said source of supply, stand pipes and bell, said distributor having means for alternately and separately connecting each of said stand pipes successively with said source of supply and said bell and a common chamber connected with said standpipes at the top thereof.

3. Gas testing apparatus, comprising a pressure indicator, a pair of stand pipes connected at their tops to a common chamber open to atmosphere, a source of gas supply, and a distributor having means for periodically connecting each of said stand pipes separately and successively with said source of supply and with said indicator, each pipe being disconnected from said source of supply while connected with said indicator.

4. Gas testing apparatus, comprising an indicator, a pair of stand pipes, a source of supply, means for alternately connecting said stand pipes separately with said source of supply and said indicator, and a common chamber connected with the tops of said stand pipes and open to atmosphere.

5. Gas testing apparatus, comprising a tank having a fluid therein, an inverted bell sealed by said fluid, a balance beam for supporting said bell, an electric circuit, means actuated by said beam for controlling said circuit, the exterior of said bell being subjected to atmospheric pressure, a stand pipe, a source of supply, and means for alternately connecting said stand pipe with said source of supply and the interior of said bell and for disconnecting said stand pipe from said source of supply while connected with said bell to subject the interior of said bell to the pressure of a stationary column of gas in said stand pipe.

6. Gas testing apparatus, comprising a tank, an inverted bell within said tank, liquid within said tank for sealing said bell, the exterior of said bell being subjected to atmospheric pressure, a balance beam for supporting said bell, an electric circuit, contact members actuated by said beam for controlling said electric circuit, a pair of stand pipes having a common chamber at their tops open to atmosphere, a source of gas supply, a distributor connected with said source of supply and with said stand pipes and with the interior of said bell, and a dividing device movably arranged within said distributor and adapted to connect each of said stand pipes separately and alternately with said source of supply and the interior of said bell and to disconnect each stand pipe from the source of supply while it is connected with said bell and to disconnect each stand pipe from said bell while it is connected with said source of supply.

7. Gas testing apparatus, comprising a pump, a pair of stand pipes, and a cylindrical distributor, said distributor having a rotary divider therein concentrically arranged therewith and extending across said distributor, said pipes being connected with said distributor on the side of a given diameter adjacent the connection with said pump so that said pump will be connected at all times with one or the other of said stand pipes.

8. Gas testing apparatus comprising in combination, a liquid sealed bell mounted for movement responsive to gas pressure within said bell, a stand pipe having a conduit connection with said bell, a pump for delivering gas to said stand pipe, an indicating instrument, an electric circuit for said instrument, and means for introducing resistance into said circuit in proportion to the movement of said bell.

9. Gas testing apparatus comprising in combination, a liquid sealed bell mounted for movement responsive to gas pressure within said bell, a pair of stand pipes connected at their top portions and open to the atmosphere, a distributor connecting the bottom of said pipes, a conduit connecting said distributor with said bell, a pump connected with said distributor, means for alternately connecting said stand pipes with said pump and conduit, and an indicating instrument controlled by the movement of said bell.

10. Gas testing apparatus comprising an indicator, a pair of stand pipes, a source of gas supply, and means for alternately connecting said stand pipes separately with said source of supply and with said indicator comprising a valve movably mounted within a chamber connected with said source of supply, said chamber having openings therein communicating with said stand pipes, said openings being arranged with respect to said valve so that one of said openings is thrown into communication with said source of supply before the other of said openings is cut off from communication with said source of supply.

11. A gas testing apparatus comprising a chamber, a valve rotatable in said chamber, stand pipes opening into said chamber on opposite sides thereof, an inlet pipe from a source of supply opening into said chamber, means for moving said valve to alternately connect said stand pipes with said source of supply, said valve being so located with respect to said stand pipes as to cause one of said stand pipes to be connected with said source of supply before communication is discontinued between the other of said stand pipes and the source of supply.

12. A gas testing apparatus comprising a distributor chamber, an inlet to said chamber, outlets from said chamber and means for connecting said inlet with one of said outlets before disconnecting said other outlet from said inlet.

In testimony whereof I have signed my name to this specification on this 31st day of March, A. D. 1924.

ARTHUR B. CUNNINGHAM.